United States Patent [19]
Andonian

[11] Patent Number: 4,768,824
[45] Date of Patent: Sep. 6, 1988

[54] TRUCK BED COVERING

[76] Inventor: Garbis Andonian, 138 Grant St., Lexington, Mass. 02173

[21] Appl. No.: 919,367

[22] Filed: Oct. 16, 1986

[51] Int. Cl.⁴ ............................................. B60P 3/34
[52] U.S. Cl. ..................................... 296/165; 296/27; 296/905; 296/173
[58] Field of Search ................... 296/27, 156, 163–165, 296/173, 105, 262; 52/66, 71

[56] References Cited

U.S. PATENT DOCUMENTS

| | | | |
|---|---|---|---|
| 2,837,778 | 6/1958 | Kern | 52/66 |
| 3,286,414 | 11/1966 | Harrison et al. | 296/165 |
| 3,606,448 | 9/1971 | Walker | 296/105 |
| 3,690,719 | 9/1972 | Yount | 296/164 |
| 3,709,551 | 1/1973 | McCarthy | 52/66 |
| 4,027,912 | 6/1977 | Pacca | 296/164 |
| 4,542,911 | 9/1985 | Mulligan | 296/173 |

FOREIGN PATENT DOCUMENTS

| | | | |
|---|---|---|---|
| 1255907 | 12/1967 | Fed. Rep. of Germany | 52/66 |
| 2296545 | 7/1976 | France | 296/173 |
| 822562 | 10/1959 | United Kingdom | 296/27 |

Primary Examiner—James B. Marbert
Attorney, Agent, or Firm—Charles Hieken

[57] ABSTRACT

A collapsible truck bed covering structure includes left and right base members fastened to the top of left and right sidewalls, respectively, of the truck bed. Left and right sidewalls are hinged at the bottom to the left and right base members, respectively. Trolleys at the top of the left and right sidewalls are couple to the rails in a top member so that raising and lowering the top member, raises and lowers the sidewalls. Rear and front window frames are hinged at the bottom with a pin and inverted J-slot hinges between horizontal retracted and vertical extended positions and releasably locked by post and keyway structure.

13 Claims, 5 Drawing Sheets

TRUCK BED COVERING

The present invention relates in general to truck bed covering and more particularly concerns novel apparatus and techniques for covering an open truck bed with a selectively collapsible structure that may be easily opened to form an accessible covered windowed volume and readily collapsed when not in use to cover the truck bed at a level below the rear window of the truck cab. The structure is sturdy, relatively easy to attach to and remove from a truck bed, relatively easy and inexpensive to fabricate, easily extended or collapsed and presents an attractive appearance when both extended and collapsed.

A popular item for open-bedded trucks is a windowed truck bed cover.

A search of subclasses 164 and 165 of class 296 uncovered U.S. Pat. Nos. 3,009,212, 3,145,044, 3,175,857, 3,286,414, 3,458,232, 3,582,129, 3,583,755, 3,690,719, 4,294,484, and Canadian Pat. No. 834,014.

It is an important object of this invention to provide improved apparatus and techniques for truck bed covering.

According to the invention, there are first and second side base means, which may be regarded as left and right base means, for being detachably secured to the side panels, typically left and right sidewalls defining an inside region therebetween, of an open truck bed hingeably supporting first and second side panel means, typically left and right sidewall means each having a top and bottom and hinged at the bottom for swinging movement between a horizontal retracted position inside said sidewalls when collapsed inwardly of the truck bed side panels and a vertical extended position substantially coextensive with the truck bed side panels and above the sidewalls. There is top wall means hingeably attached to the base means to which the side panel means are hingeably attached for covering the truck bed and movable between a lowered collapsed or retracted position and an upper extended position resting upon the tops of the side panel means. The top wall means may have rail means for accommodating movable members. Preferably there is windowed front panel means hingeable at the bottom for displacement between a horizontal collapsed or retracted position between the top panel or wall means and a vertical extended position supporting the front of the top panel means, and windowed rear panel means hinged at the bottom for movement between a collapsed or retracted horizontal position beneath the top panel means and an extended vertical position supporting the rear end of the top panel means. Preferably, the rear panel means includes a transparent light hingeably attached to a frame in the panel means at the top that may be opened and supported in an open position by side strut means. Preferably there is trolley means fastened to the top of the side wall means having movable members for engaging the rail means and converting raising and lowering movement of the top wall means into angular movement of the sidewall means about the lower edge thereof between the retracted and extended positions, whereby raising and lowering a side of the top wall means extends and retracts the associated sidewall means respectively between the retracted and extended positions.

Numerous other features, objects and advantages of the invention will become apparent from the following specification when read in connection with the accompanying drawing in which.

Figure 1:
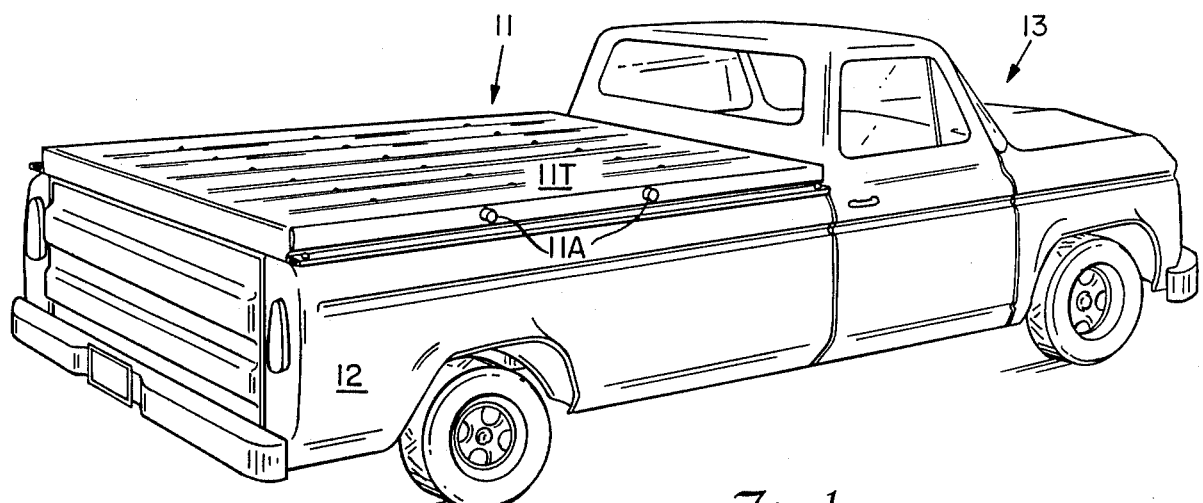
FIG. 1 is a perspective view of an embodiment of the invention covering the truck bed.

With reference now to the drawing and more particularly FIG. 1 thereof, there is shown a perspective view of a truck bed cover 11 according to the invention seated on the open truck bed 12 of truck 13. Truck bed cover 11 includes a pair of handle knobs, such as 11A, on each side for raising each side to the extended position. The same reference symbols identify corresponding elements throughout the drawing.

Figure 2:
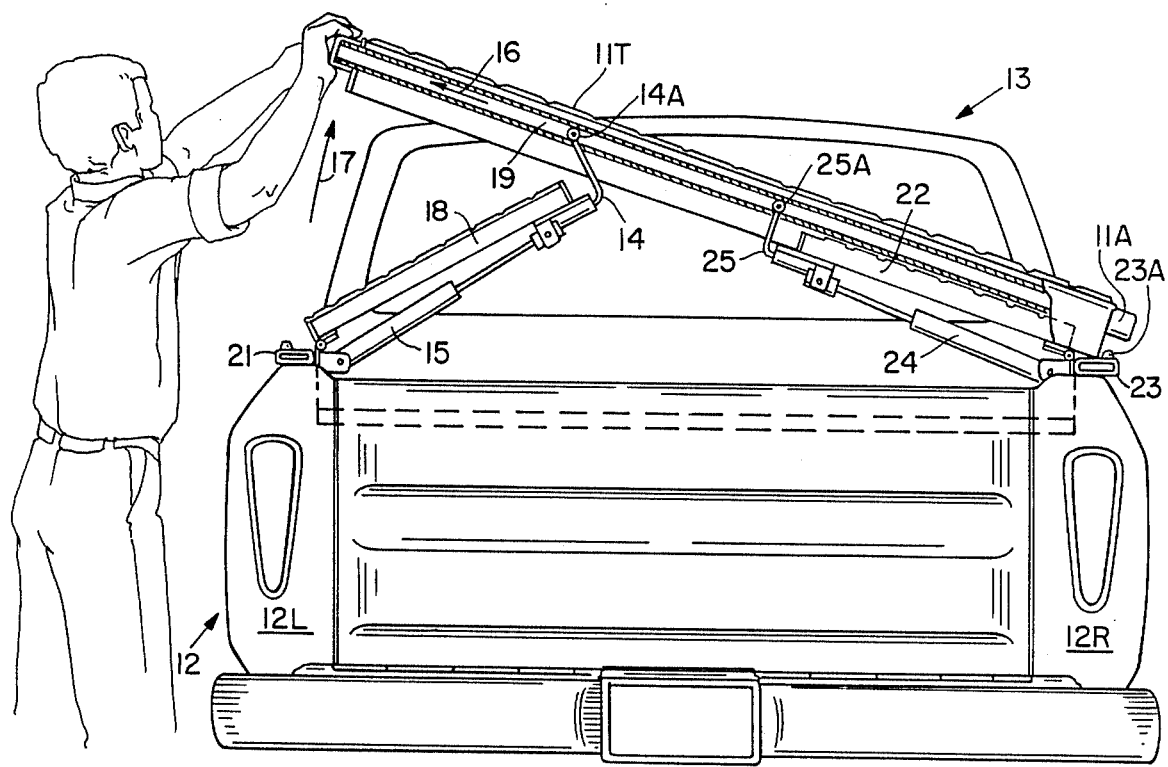
FIG. 2 is a view from the rear showing the left side being raised toward the erected position.

Referring to FIG. 2, there is shown a rear view of the covered truck of FIG. 1 illustrating how the left side is raised to the extended position. Exerting force upward on the left knobs raises the left side of top 11T and causes trolley 14 and gas strut system 15 to move outward and upward with the roller 14A of trolley 14 moving in the direction indicated by arrow 16 in response to the upward force represented by arrow 17 to raise left side panel 18 to an uprigth position. The right side of roof 11T then rests against a rubber bumper 23A along the outside edge of base 23. Left panel 18 is hingeably attached to a left base member 21 that is secured to the top of left bed panel 12L. The left gas strut 15 is hingeably attached a the bottom to left base 21 and comprises a conventional gas shock absorber of the type used for automobiles.

Right panel 22 is hingeably attached at the bottom to right base member 23 that is secured to the top of right panel 12R of truck bed 12. Right gas strut 24 is hingeably attached to right base 23 and connected to right trolley 25 having a roller 25A that rides in track 19 of top 11T toward the right when the right side is raised by grasping handles 11A.

Figure 3:
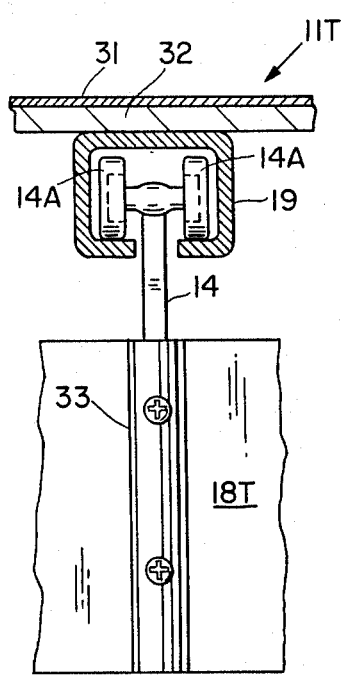
FIG. 3 illustrates a detail of the trolley.

Referring to FIG. 3, there is shown a fragmentary view partially in section illustrating the details of the trolley structure. Top 11T typically comprises corrugated aluminum roof sheathing 31 over masonite interior trim 32. Track 19 comprises an aluminum extruded channel in which a pair of bearing-mounting nylon wheels comprising roller 14A ride. Trolley 14 is fastened to the top strip 18T of sidewall 18 secured by a protective mounting collar 33.

Figure 4:
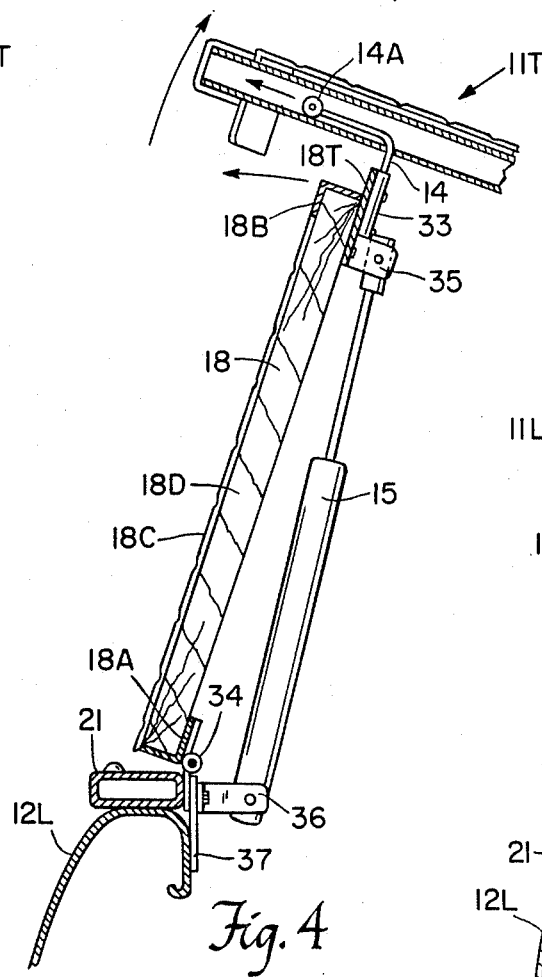
FIG. 4 is an end sectional view illustrating structural details of the relationship among a side panel, truck bed side panel and top panel.

Referring to FIG. 4 there is shown an elevation view partially in section illustrating details of the left side while being raised. Left sidewall 18 includes protective right angle channels 18A and 18B and includes corrugated aluminum roof sheathing 18C on the outside on a frame visible in FIG. 10 typically made of ⅜" thick clear pine or plywood. Masonite interior trim 18D may line the inside. Sidewall 18 is continuously attached on its lower inside horizontal edge by butterfly hinge 34 attached to base 21, typically a 1"×3" aluminum extrusion. Pin hinge 35 is secured to sidewall top strip 18T for hingeably connecting the rod of strut 15 to sidewall 18. Pin hinge 36 is mounted on mounting plate 37, resting half on butterfly hinge 34 and half on the inside of truck side wall 12L for hingeably connecting the bottom of strut 15 to base 21.

Figure 5:
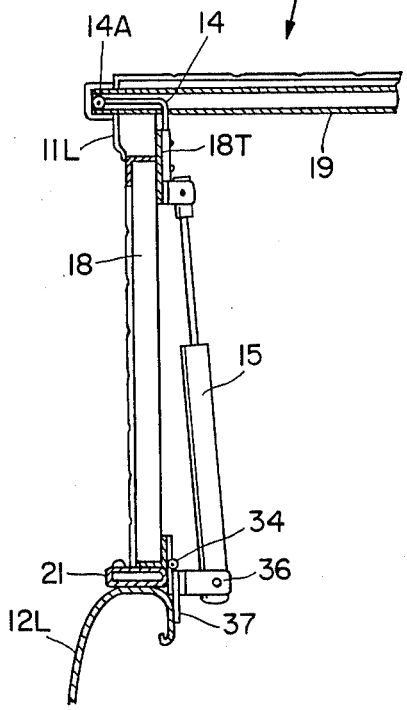
FIG. 5 is a fragmentary end view illustrating a detail of the left side panel fully upright.

Referring to FIG. 5, there is shown a fragmentary elevation view partially in section simialr to that of FIG. 4 with sidewall 18 fully upright showing how the sidewall top strip 18T engages member 11L while the bottom of sidewall 18 rests on base 21.

Figure 6:
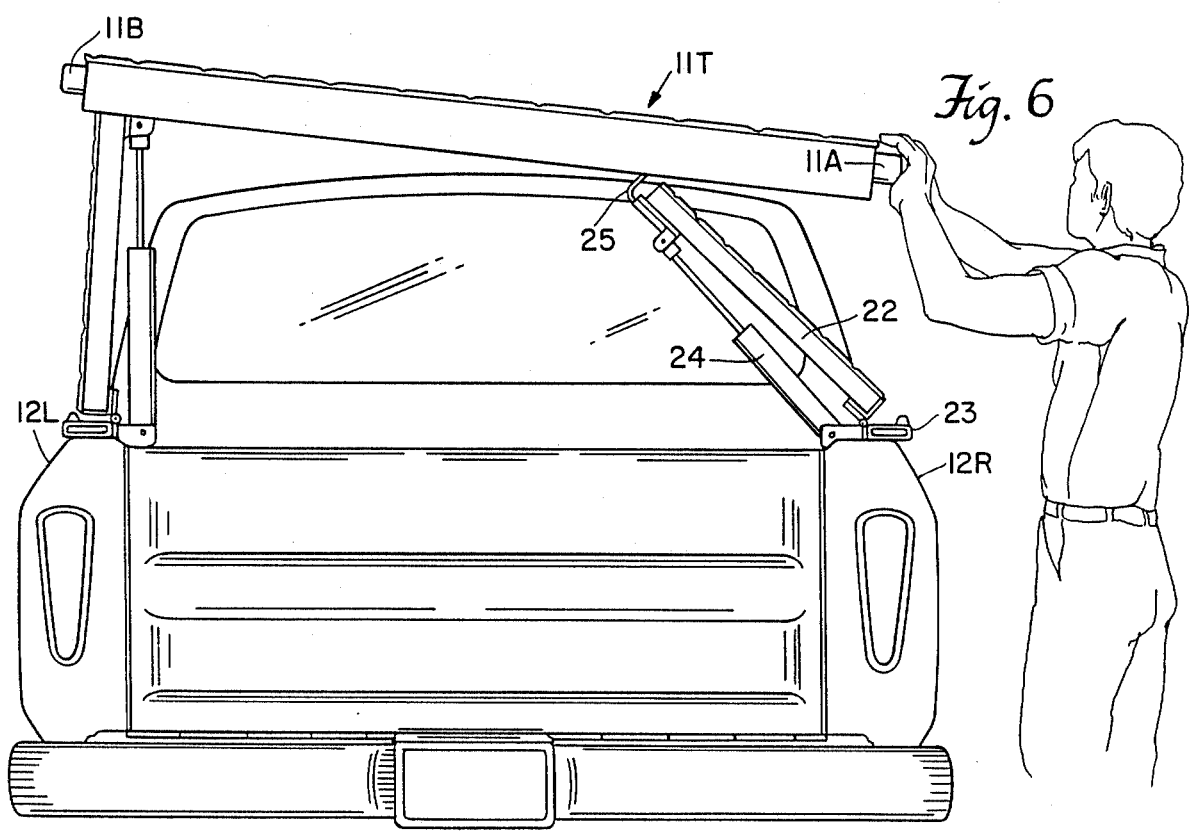
FIG. 6 is a rear view of the invention on a truck bed showing how the right side may be raised to the extended position.

Referring to FIG. 6, there is shown a rear view illustrating how raising the right side of top 11T by raising knobs 11A causes right sidewall 22 and associated mechanisms to move clockwise toward the fully upright position in a manner similar to that described above in connection with raising the left sidewall 18 to the upright position. The mechanism on the right side is essentially the same as that on the right side and will not be described in detail here.

Figure 7:
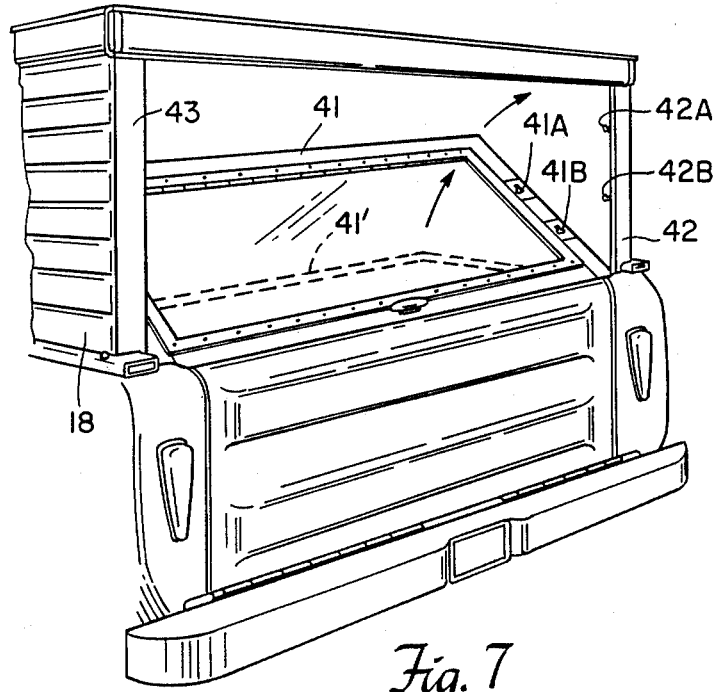
FIG. 7 is a perspective fragmentary view of the rear showing how the rear panel is raised to the extended position.

Referring to FIG. 7, there is shown a fragmentary perspective view of the rear illustrating the next step in manipulating the cover to the fully upright position. Rear window frame 41 hingeably attached to base members 21 and 23 at the bottom left and right moves from the retracted horizontal position 41' toward the fully upright vertical position where keyways 41A and 41B engage mating posts 42A and 42B extending from the inside of solid aluminum corner angle strut 42 attached to the rear end of right sidewall 22. A similar right angle strut at the rear end of sidewall 18 has a similar pair of posts that mate with similar keyways on the left side of frame 41 not visible in FIG. 7.

Figure 8:
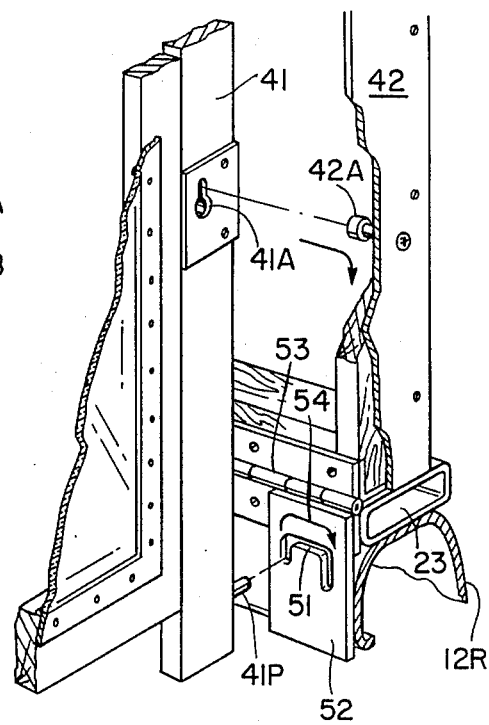
FIG. 8 is a fragmentary exploded view illustrating details of the rear window frame mounting.

Referring to FIG. 8, there is shown a fragmentary enlarged exploded view illustrating the relationship among rear window frame 41 and other portions of the structure. The hinge comprises a hinge pin 41P at the bottom right of frame 41 that rides in inverted J-slot 51 in slotted plate 52 secured to the bottom leaf of right butterfly hinge 53 secured to base 23. The lower portion of slotted plate 52 rests against the top inside of right truck bed sidewall 12R. Inverted J slot 51 guides pin 41P in the direction of arrow 54 as rear window frame 41 is pulled to a vertical position. At the high point in travel, keyways 41A and 41B mate with posts 42A and 42B, respectively, to allow their heads to enter and then lock in place as frame 41 moves downward to the low point of travel.

Figure 9:
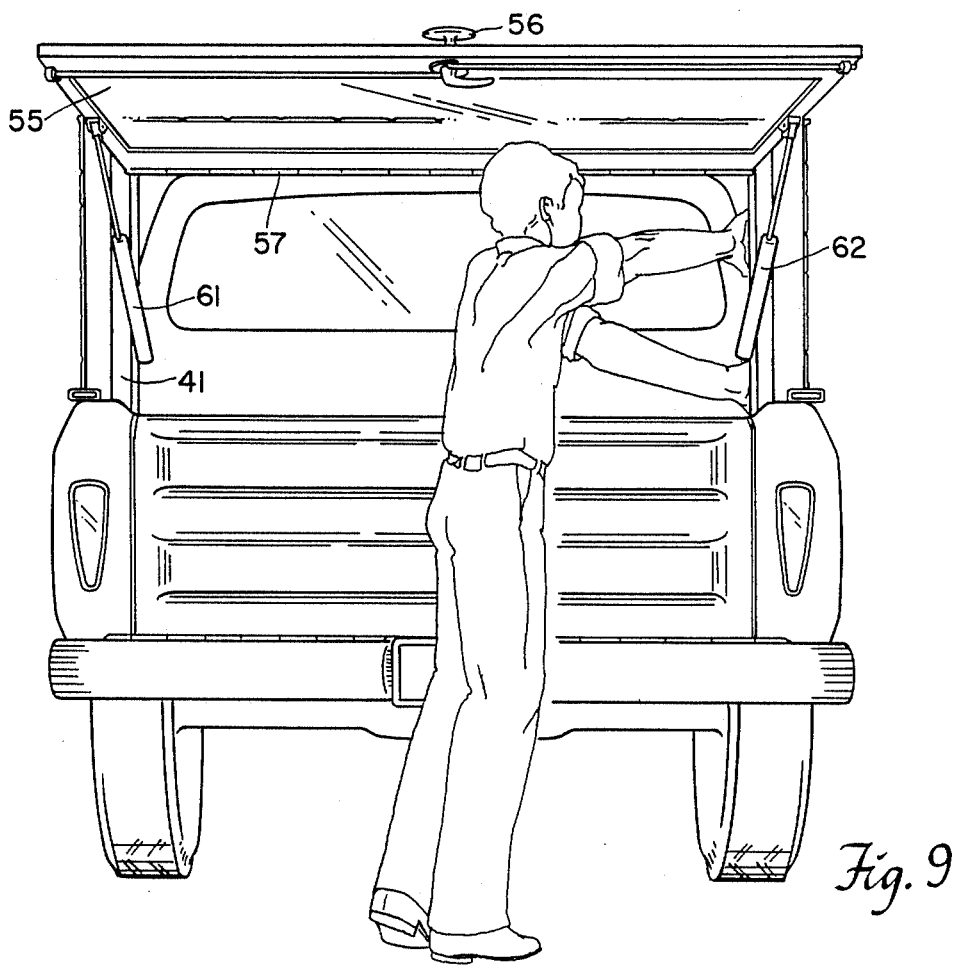
FIG. 9 is a rear view showing how the rear window is raised to allow access for raising the front frame.

Referring to FIG. 9, there is shown a rear view with rear window 55 has a transparent light and open. Rear window 55 is opened by grasping handle 56 and raising it as it rotates about continuous horizontal top hinge 57. Left and right sidewall struts 61 and 62, respectively, hold window 55 open. The lower ends of these struts are mounted on rear window frame 41 below each lower keyway, such as 41B.

Figure 10:
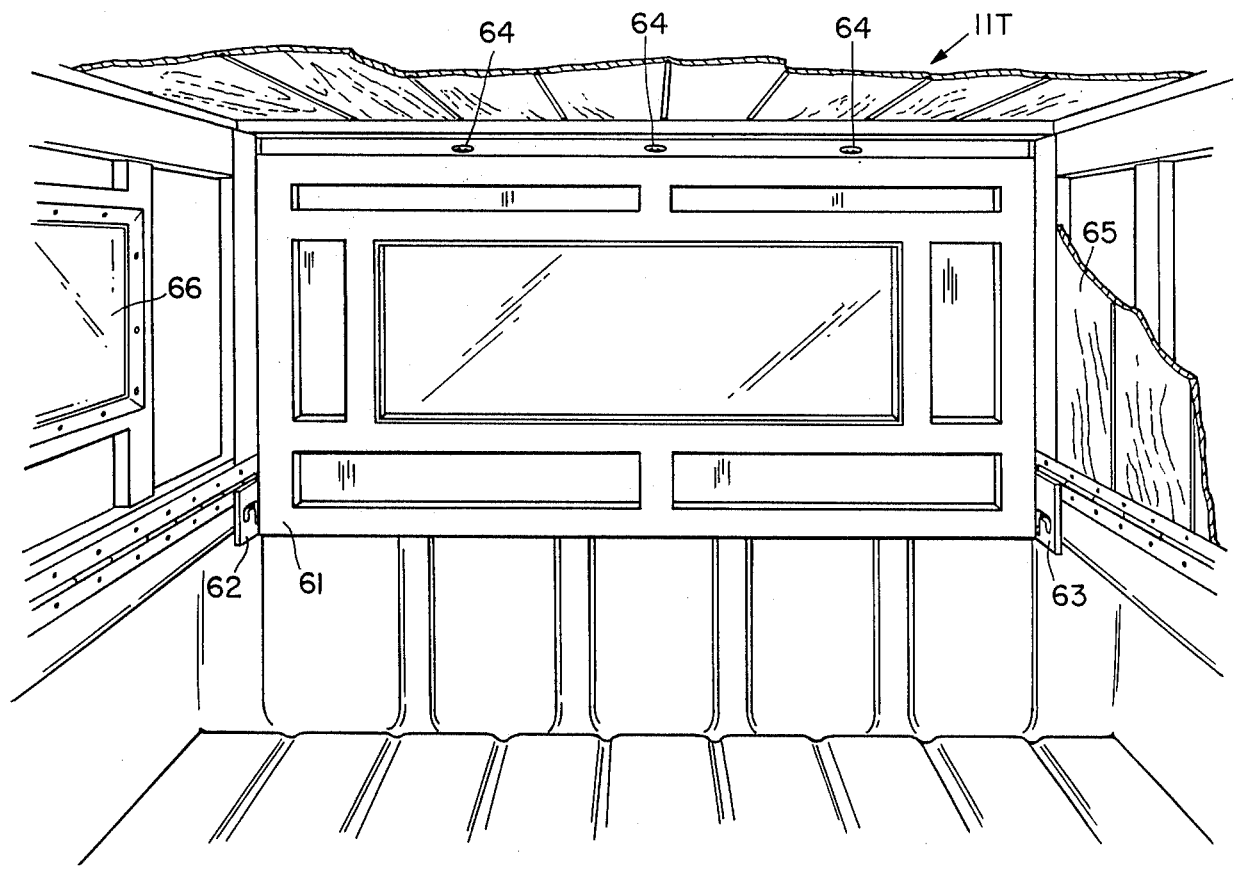
FIG. 10 is a fragmentary perspective view of the inside showing the front panel extended.

Referring to FIG. 10, there is shown a fragmentary perspective view from the rear illustrating how the forward window frame 61 is locked in place to complete fully extending the cover. Forward window frame 61 includes a hinging structure similar to that used for rear window frame 41. There are lower hinge pins (not shown) that ride in inverted J slots in left and right slotted plates 62 and 63, respectively, with similar keyway-post connections. There may also be travel locks, such as 64, at the top for reducing vibration during travel and also may be located at the top of frame 41. FIG. 10 also shows some alternatives for the sidewalls. The sidewalls may be lined with paneling, such as 65, or having a window, such as 66 as an optional feature.

Figure 11:
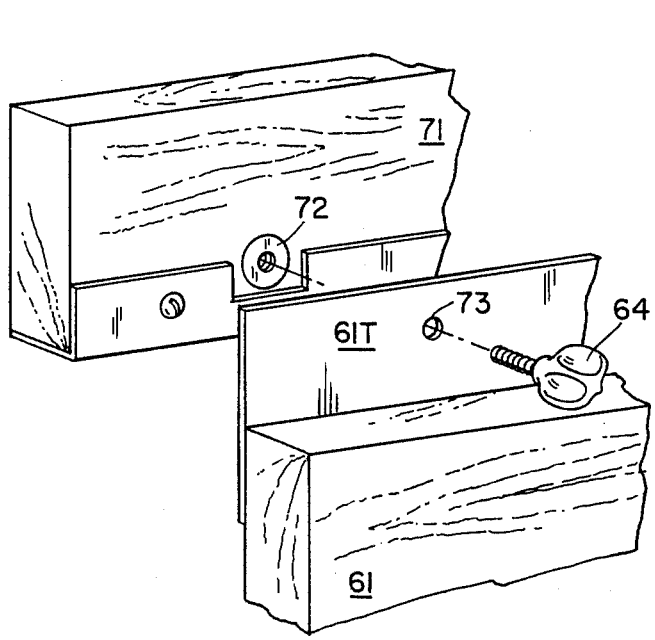
FIG. 11 is a fragmentary exploded perspective view illustrating how the travel lock secures the forward window frame.
Figure 12:
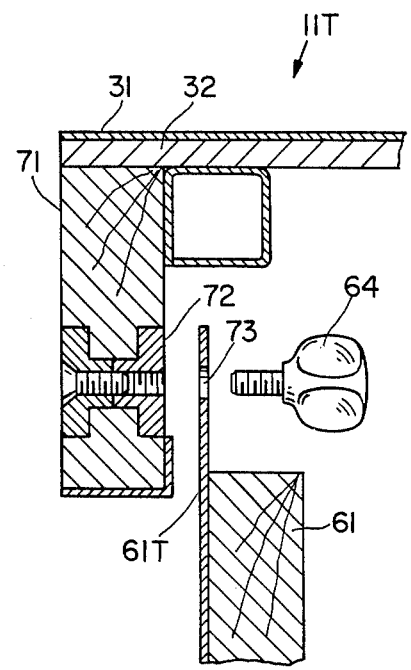
FIG. 12 is a side sectional view generally of the structure shown in FIG. 11.

Referring to FIG. 11, there is shown a fragmentary exploded view illustrating a detail of a travel lock. A forward depending beam 71 of top 11T carries threaded anchors, such as 72. A top strip 61T attached to the top of window frame 61 is formed with openings, such as 73 through which threaded fastener 64 passes to engage anchor 72 and allow top strip 61T to snugly engage member 71. Referring to FIG. 12, there is shown a fragmentary side elevation view helpful in understanding this fastening relationship.

Figure 13:
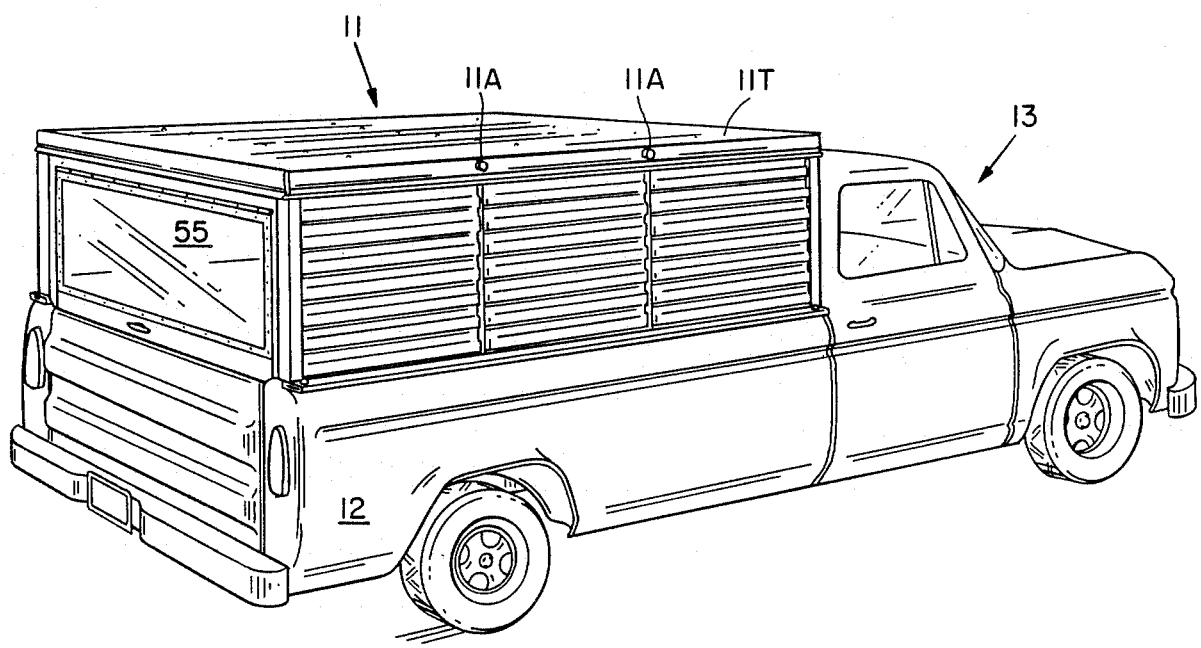
FIG. 13 is a perspective view of the invention in the extended position.

Referring to FIG. 13, there is shown a perspective view of the truck with the cover in the fully erected position.

Disassembly is as easy and rapid as assembly. Rear window 55 is opened, allowing access to front window frame 61. Fasteners 64 are disengaged, and front window frame raised slightly to disengage, pulled backward and then downward into the horizontal position. Travel locks on frame 41 are then disengaged and with rear window 55 remaining open, frame 41 is raised slightly and pushed slightly rearward. Window 55 is then closed and frame 41 is pushed rearward and downward to the horizontal position. Then the right and left sides of top 11T are guided downward by grasping handles 11A and 11B, respectively, after pushing side walls 18 and 22 downward and inward to the horizontal position with top 11T following downward to the position shown in FIG. 1. Erection and retraction takes less than a minute ordinarily and can be readily accomplished by one person without using any special tools.

There has been described novel apparatus and techniques for truck bed covering that allows the truck bed cover to be stored in a collasped position on the truck bed itself while affording protection of the open bed and allowing the driver full visibility through the rear window with good stability. When erection is desired, it may be readily accomplished, access to the interior is readily obtained through the rear window, and the driver still has good visiblity through the front and rear windows.

It is evident that those skilled in the art may now make numerous uses and modifications of the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Truck bed covering apparatus comprising, left and right base means for attachment to the top of left and right sidewalls respectively of a truck bed defining an inside region therebetween, left and right sidwall means each having a top and bottom and being hingeably attached at the bottom to said left and right base means respectively for movement between a horizontal retracted position inside said sidewalls and a vertical extended position above said sidewalls each defining a plane between said top and bottom in all positions thereof, top wall means having left and right sides for covering a truck bed and having rail means for accommodating movable members, trolley means fastened to the top of said sidewall means having moveable members for engaging said rail means and converting raising and lowering movement of said top wall means into angular movement of said sidewall means about the lower edge thereof between said retracted and extended positions, whereby raising and lowering a side of said top wall means extends and retracts the associated sidewall means respectively between said retracted and extended positions.

2. Truck bed covering apparatus in accordance with claim 1 and further comprising, rear window frame means having a bottom and being hingeably connected to the bottom thereof to the rear of said left and right base means, said rear window frame means being movable between a retracted horizontal position inside said truck bed sidewalls and an extended substantially vertical position above the truck sidewalls, and means for releasably locking said rear window frame means in said extended position.

3. Truck bed covering apparatus in accordance with claim 2 wherein said means for releasably locking includes left and right inverted J-slot plates attached to said left and right base means respectively, pin means attached to said rear window frame means for engaging said inverted J-slot means, and post and keyway slot fastening means for intercoupling said rear window frame means and said sidewalls.

4. Truck bed covering apparatus in accordance with claim 1 and further comprising, front window frame means having a bottom and being hingeably attached at the bottom for movement between a horizontal retracted position inside said truck sidewalls and a substantially vertical extended position, and means for releasably locking said front wall means in said extended position.

5. Truck bed covering apparatus in accordance with claim 2 and further comprising, front window frame means having a bottom and being hingeably attached at the bottom for movement between a horizontal retracted position inside said truck sidewalls and a substantially vertical extended position, and means for releasably locking said front wall means in said extended position.

6. Truck bed covering apparatus comprising, first and second side base means for being detachably secured to the side panels of an open truck bed, first and second side panel means each having a top and bottom and being hingeably attached to said first and second side base means respectively at the bottom of each side panel means for swinging movement between a horizontal position when collapsed inwardly of the truck bed side panels and a vertical position substantially coextensive with the truck bed side panels, and top panel means hingeably attached to said first and second side base means for covering the truck bed and movable between a lowered collapsed position and an upper extended position resting upon the tops of said first and second side panel means.

7. Truck bed covering apparatus in accordance with claim 6 and further comprising, windowed front panel means having a top and a bottom hingeable at the bottom for displacement between a horizontal collapsed position below said top panel means and a vertical extended position supporting the front of said top panel means.

8. Truck bed covering apparatus in accordance with claim 6 and further comprising, windowed rear panel means having a top and bottom and hinged at the bottom for movement between a collapsed horizontal position beneath said top panel means and an extended vertical position supporting the rear end of said top panel means.

9. Truck bed covering apparatus in accordance with claim 7 and further comprising, windowed rear panel means having a top and bottom and hinged at the bottom for movement between a collapsed horizontal position beneath said top panel means and an extended vertical position supporting the rear end of said top panel means.

10. Truck bed covering apparatus in accordance with claim 9 wherein said rear panel means includes a window frame and further comprising, a transparent light hingeably attached to said window frame at the top that may be opened, and side stuct means for supporting said transparent light in an open position.

11. Truck bed covering apparatus in accordance with claim 1 wherein said apparatus is free of springs fastened to the outside of said truck bed covering apparatus so that each side of said top wall means may be independently raised and lowered to allow one person to raise and lower the top wall means sides and extend and retract both associated sidewall means respectively between said retracted and extended positions.

12. Truck bed covering apparatus in accordance with claim 6 wherein said apparatus is free of springs fastened to the outside of said truck bed covering apparatus so that each side of said top wall means may be independently raised and lowered to allow one person to raise and lower the top wall means sides and extend and retract both associated sidewall means respectively between said retracted and extended positions.

13. Truck bed covering apparatus in accordance with claim 1 wherein said moveable members comprise rollers in said rail means at all times located above the associated sidewall means.

* * * * *